United States Patent

Abbondanza et al.

[11] Patent Number: 6,066,280
[45] Date of Patent: May 23, 2000

[54] PROCESS FOR THE PREPARATION OF MANUFACTURED PRODUCTS BASED ON VINYLAROMATIC POLYMERS WITH A PREDOMINANTLY SYNDIOTACTIC STRUCTURE

[75] Inventors: Luigi Abbondanza, Novara; Gianluigi Marra, Galliate; Giorgio Giannotta, Novara; Antonio Gennaro, Cameri, all of Italy

[73] Assignee: Enichem S.p.A., Milan, Italy

[21] Appl. No.: 09/010,117

[22] Filed: Jan. 21, 1998

[30] Foreign Application Priority Data

Feb. 6, 1997 [IT] Italy .................................. MI97A0234

[51] Int. Cl.[7] .................................................... B29C 67/04
[52] U.S. Cl. .............................................................. 264/126
[58] Field of Search ...................... 264/119, 120, 264/123, 125, 126, 127, 109

[56] References Cited

U.S. PATENT DOCUMENTS

| | | | |
|---|---|---|---|
| 4,161,502 | 7/1979 | Wessling et al. | 264/119 |
| 4,352,766 | 10/1982 | Bradley et al. | 264/45.5 |
| 5,032,335 | 7/1991 | Wilson | 264/113 |
| 5,142,005 | 8/1992 | Albizzati et al. | 526/125 |
| 5,270,353 | 12/1993 | Nakano et al. | 523/214 |
| 5,651,931 | 7/1997 | Bailey et al. | 264/126 |

FOREIGN PATENT DOCUMENTS 0 561 273  9/1993  European Pat. Off. .
1 094 267  12/1967  United Kingdom .

OTHER PUBLICATIONS

Kirk–Othmer Encyclopedia of Chemical Technology, 4th Edition, vol. 22, pp. 1021–1022.

Derwentj Abstracts, AN 96–483935, Research Disclosure, RD 390037, vol. 390, No. 037, "Syndiotactic Polystyrene for Filters and Nonwovens—Can be Melt Extruded to Form Net–Like Filters or Injection Moulded to Form Disposable Liquid Cartridge Filters, and Processed into Battery Separator", Oct. 10, 1996.

*Primary Examiner*—Jan H. Silbaugh
*Assistant Examiner*—Stefan Staicovici
*Attorney, Agent, or Firm*—Oblon, Spivak, McClelland, Maier & Neustadt, P.C.

[57] ABSTRACT

Process for the preparation of manufactured products based on vinylaromatic polymers with a predominantly syndiotactic structure which comprises:

a) compressing the polymer in powder form in a mould at a pressure ranging from 0.1 to 500 MPa;
b) sintering, under pressure, the compact powder at a temperature ranging from the glass transition temperature (Tg) of the polymer to the melting temperature (Tm);
c) cooling the manufactured product to room temperature.

17 Claims, No Drawings

PROCESS FOR THE PREPARATION OF MANUFACTURED PRODUCTS BASED ON VINYLAROMATIC POLYMERS WITH A PREDOMINANTLY SYNDIOTACTIC STRUCTURE

The present invention relates to a process for the preparation of manufactured products based on vinylaromatic polymers with a predominantly syndiotactic structure and the manufactured products thus obtained.

More specifically the present invention relates to a process for the preparation of plates by the compaction, at a temperature lower than the melting point, of powders of vinylaromatic polymers with a predominantly syndiotactic structure and the plates thus obtained.

The preparation of manufactured products based on polymers by the sintering of the corresponding polymers in powder form, is already known. In fact, some polymers require, for reasons linked to an intrinsic low molecular mobility, particular transformation methods which allow a manufactured product to be obtained without necessarily passing through the conventional transformation processes essentially based on the complete melting of the materials.

Products of this type are fluorinated polymers, polyethylene with an ultra-high molecular weight (UHMWPE) and other polymers such as polyphenylenesulfide whose macromolecular structure is partially cross-linked. In these polymers, in fact, the extremely high viscosities of the molten product, which arise during conventional transformation technologies such as extrusion, injection moulding, calendering or thermo-compression, makes these technologies difficult and non-economical. In addition, the development of extremely high shear rates easily causes phenomena such as fluid-dynamic irregularities and chain separations.

Alternative transformation processes comprise two distinct operating steps. In the first an aggregation of the powders is carried out by subjecting them to high static pressure. In the second the actual sintering of the material is produced by means of a thermal treatment at a high temperature (free-sintering), capable of producing the complete coalescence of the particles and the elimination of the voids. For example, in the case of polytetrafluoroethylene (PTFE), the material in powder form is preformed by compression of the powder at a temperature which is not very high (below 100° C.) and a pressure of 200–350 bars and, then sintered at a temperature of 370–390° C. in air circulation ovens.

A further alternative transformation process is that known as "pressure sintering", typical of both PTFE and UHMWPE. In this case the preform under pressure is heated for the sintering step after a partial pressure release. At the end of this step there is a post-thermal treatment to eliminate internal stresses from the body thus formed.

In the case of UHMWPE the preferred technology is "pressure sintering" in which the powders are subjected to temperatures of 200–250° C. and pressures of 4–10 MPa. This is therefore a compression moulding in which however the viscous slip phenomena are greatly limited owing to the high viscosity of the material.

The sintering process described above cannot normally be carried out with thermoplastic polymers which have viscosities in the molten state that are compatible with the traditional transformation technologies, for two reasons. The first is for reasons of productivity, the second is linked to the fact that, in most cases, manufactured products obtained by sintering at a low temperature, have lower physico-mechanical characteristics than those of analogous manufactured products prepared with traditional technologies.

In this context, the Applicant has surprisingly found that, in the case of vinylaromatic polymers with a predominantly syndiotactic structure, it is possible to obtain the complete aggregation of the material and produce compact and homogeneous manufactured products, remaining however decisively below their melting points.

This behaviour does not occur in other thermoplastic polymers, for example in semicrystalline polymers such as polyethyleneterephthalate (PET) or polyethylene (PE), as can be seen both in the known art (for example, Advance in Polymer Technology, Vol. 12, Nr. 3, pages 281–289, 1993) and in the illustrative examples provided hereunder.

The examples provide comparisons in which semicrystalline polymers (PET or PE) and syndiotactic polystyrene (SPS) are moulded or extruded with conventional technologies and by compaction of the powders at a temperature lower than the melting point. As can be seen, for PET and PE, there are very evident differences in the properties of the manufactured products, proving the non-suitability of these materials to undergo an effective aggregation process and compaction under these conditions. On the contrary, end-products produced from SPS powders have, after compaction, characteristics which are comparable to or even higher than analogous manufactured products moulded or extruded in the conventional way.

In fact, the densities which are normally obtained by compaction at low temperature of powders of thermo-plastic polymers (for example PET or PE), usually prove to have values more or less 5–20% lower with respect to the actual density of homogeneous manufactured products. This inevitably results in a loss of mechanical properties.

The present invention therefore relates to a process for the preparation of manufactured products based on vinylaromatic polymers with a predominantly syndiotactic structure which comprises:

a) compressing the polymer in powder form in a mould at a pressure ranging from 0.1 to 500 MPa;
b) sintering, under pressure, the compact powder at a temperature ranging from the glass transition temperature (Tg) of the polymer to the melting temperature (Tm);
c) cooling the manufactured product to room temperature.

According to the present invention, preferred manufactured products based on vinylaromatic polymers are flat plates with thicknesses greater than a millimeter and particularly with thicknesses ranging from 2 to 4 mm.

Vinylaromatic polymers with a predominantly syndiotactic structure are products which are known in literature and described, for example in European patent 210.615 or in U.S. Pat. No. 5,142,005. In particular, preferred vinylaromatic polymers are those selected from polymers of styrene and derivatives of styrene and the relative copolymers containing up to 20% in moles of another copolymerizable monomer selected from those having the general formula:

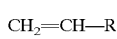

in which R represents a hydrogen atom or a $C_1$–$C_6$ alkyl radical or a $C_4$–$C_{12}$ cyclo-alkyl radical.

Derivatives of styrene comprise alkyl styrenes, in which the alkyl group contains from 1 to 4 carbon atoms, halogenated styrenes, $C_1$–$C_4$-alkoxy styrenes, carboxy styrenes, vinylnaphthalenes, such as alpha- or beta-vinyl naphthalene, vinyl tetrahydro naphthalene such as 1,2,3,4-tetrahydro-6-vinyl naphthalene, etc. Typical examples of substituted styrenes are p-methylstyrene, m-methylstyrene, alone or mixed with each other, ethylstyrene, butylstyrene, p-ter-butylstyrene, dimethylstyrene, chlorostyrene, bromostyrene, fluorostyrene, chloromethylstyrene, methoxystyrene, acetoxy methylstyrene, etc.

The vinylaromatic polymer can be used in the process of the present invention both in the original morphology of powder coming from synthesis and as powder coming from the fine grinding of the granule using equipment known in the art, for example with mills. The powder generally has a particle size of less than 500 micrometres.

The polymer is sintered by contemporaneously subjecting it to pressure and temperature. The sintering times, although depending on the operating conditions, are generally between 1 minute and 10 hours.

Some illustrative but non-limiting examples are provided for a better understanding of the present invention and for its embodiment.

In the examples the tensile tests and the elastic modulus were calculated according to ASTM D 638-M3. The impact strength was calculated according to ASTM D 256.

EXAMPLE 1 (Comparative)

PET (polyethyleneterephthalate) fibre grade, produced by Montefibre in Milan, having Tg=75° C., Tm=258° C., weight average molecular weight Mw=32,000, was used for preparing plates having a thickness of 3 mm, by compression moulding technology, at a temperature of 10–15° C. higher than the Tm. The plate was then cooled to room temperature at a rate of about 30° C./min.

The physico-mechanical characteristics of the plate thus obtained are shown in table 1.

EXAMPLES 2–3 (Comparative)

The PET of example 1 was cryogenically ground with a Retsch ZM 1 ultracentrifugal mill and sieved with a 50 mesh sieve (particle size less than 500 micrometers). The powder thus obtained was charged into a cylindrically-shaped mould with a piston having a diameter of 80 mm. The mould was placed in a press and subjected to a pressure of 50 MPa for 10 minutes, during which the temperature was maintained at values ranging from Tg to Tm. The mould was removed and cooled in air and a discoidal plate was extracted with a thickness of about 3 mm.

The physical-mechanical characteristics of the plate thus obtained are shown in table 1.

EXAMPLES 5–6 (Comparative)

The polyethylene of example 6 was sieved with a 50 mesh sieve. The powder thus obtained was used to prepare discoidal plates according to the method of examples 2 and 3 but operating at a temperature of 80 and 100° C.

In both cases, the final compaction of the plates proved to be insufficient to allow the mechanical characterization to be carried out, as can be seen in table 2.

TABLE 2

| Example | Compression temperature (C. °) | Density (kg/m³) | Tensile strength (MPa) | Elastic modulus (MPa) | Ultimate elongation (%) |
|---|---|---|---|---|---|
| 4 | 200 | 918 | 32 | 90 | 650 |
| 5 | 80 | 770 | nd | nd | nd |
| 6 | 100 | 900 | nd | nd | nd | nd = non determinable

EXAMPLE 7

37.8 g of styrene purified by passage on a basic alumina column and 115 g of solid methylaluminoxane were charged into a 70 l glass reactor. The mixture was heated under stirring to 40° C. and 438 g of cyclopenta-dienyltitanium trichloride dissolved in 150 ml of anhydrous toluene were added. After two hours of reaction, during which the temperature spontaneously rose to 55° C. and then gradually dropped, the reaction was interrupted by the addition of 100 g of sodium hydroxide dissolved in 15 l of methanol. The solid obtained was filtered, suspended in methanol and filtered again. After drying under vacuum (30 torr) at 80° C., 7.8 Kg of polymeric product were obtained (21%).

In order to eliminate the atactic fraction, the polymer was extracted with methylethylketone at boiling point for 15 hours, producing, after drying, syndiotactic polystyrene for an amount equal to 87% of the starting product.

EXAMPLE 8 (Comparative)

The syndiotactic polystyrene of example 7 was used to prepare plates having a thickness of 3 mm, operating according to the thermocompression moulding technology. The polymer, previously granulated, was moulded at a tempera-

TABLE 1

| Example | Compression temperature (C. °) | Density (kg/m³) | Tensile strength (MPa) | Elastic modulus (MPa) | Ultimate elongation (%) | Impact strength (J/m) | Molecular weight (Mw) |
|---|---|---|---|---|---|---|---|
| 1 | 270 | 1.450 | 50 | 3010 | 5 | 25 | 31000 |
| 2 | 170 | 1.375 | 10 | 3132 | 0.4 | 10 | 32000 |
| 3 | 200 | 1.377 | 9 | 3080 | 0.3 | 12 | 31000 |

EXAMPLE 4 (Comparative)

Low density linear polyethylene in powder form, produced by the Applicant under the trade-name of FLEX-IRENE CL10, having a melting point Tm of 118° C. was used to obtain plates having a thickness of about 3 mm operating according to the thermocompression moulding technology at a temperature of 200° C. The plate was then cooled to room temperature at a rate of about 30° C./min.

The physico-mechanical characteristics of the plate thus obtained are shown in table 2.

ture of about 15° C. higher than the Tm. The plate was then cooled to room temperature at a rate of about 30° C./min.

The physico-mechanical characteristics of the plate thus obtained are shown in table 3.

EXAMPLE 9–14

The syndiotactic polystyrene of example 7 was sieved with a 50 mesh sieve and used to prepare discoidal plates as described in examples 2 and 3.

The physico-mechanical characteristics of the plate thus obtained are shown in table 3.

EXAMPLE 15

The syndiotactic polystyrene of example 7 was sieved with a 50 mesh sieve and used to prepare discoidal plates as described in examples 2 and 3 but operating at a pressure of 60 MPa, with a compaction time of 20 minutes and a temperature of 175° C.

The physico-mechanical characteristics of the plate thus obtained are shown in table 3.

TABLE 3

| Example | Compression temperature (C. °) | Density (kg/m³) | Tensile strength (MPa) | Elastic modulus (MPa) | Ultimate elongation (%) | Impact strength (J/m) | Molecular weight (Mw) |
|---|---|---|---|---|---|---|---|
| 8 | 290 | 1.051 | 34.1 | 4090 | 0.90 | 8.7 | 247000 |
| 9 | 160 | 1.053 | 21.5 | 4398 | 0.55 | 8.7 | 302000 |
| 10 | 170 | 1.056 | 19.0 | 4224 | 0.51 | 9.2 | 308000 |
| 11 | 180 | 1.055 | 29.2 | 3960 | 0.84 | 8.9 | 287000 |
| 12 | 190 | 1.043 | — | — | — | 8.2 | 320000 |
| 13 | 200 | 1.044 | 30.4 | 3710 | 0.86 | 8.6 | 296000 |
| 14 | 210 | 1.047 | 27.1 | 3829 | 0.80 | 9.8 | 304000 |
| 15 | 175 | 1.059 | 36.0 | 4230 | 1.00 | 9.4 | 310000 |

EXAMPLE 16 (Comparative)

The syndiotactic polystyrene of example 7 was used to prepare plates having a thickness of about 3 mm by extrusion. A counter-rotating twin-screw extruder was used, with a temperature profile ranging from 270 to 290° C., operating at a screw rate of 150 rpm and a flow-rate of 5 Kg/h.

The physico-mechanical characteristics of the plate thus obtained are shown in table 4.

TABLE 4

| Example | Extrusion temperature (C. °) | Density (kg/m³) | Tensile strength (MPa) | Elastic modulus (MPa) | Ultimate elongation (%) | Impact strength (J/m) | Molecular weight (Mw) |
|---|---|---|---|---|---|---|---|
| 16 | 290 | 1.053 | 33.0 | 4080 | 1.00 | 8.8 | 248000 |

What is claimed is:

1. A process for the preparation of a manufactured product from a syndiotactic polystyrene polymer which comprises:
    (a) compressing the polymer in powder form at a pressure ranging from 0.1 to 500 MPa;
    (b) sintering under pressure, the compressed powder at a temperature ranging from the glass transition temperature ($T_g$) to a temperature below the melting temperature ($T_m$) of the polymer to form the manufactured product; and
    (c) cooling the manufactured product to room temperature,
    wherein said manufactured product has physical-mechanical characteristics which are comparable to a manufactured product obtained by conventional transformation processes based on complete melting of the polymer, said conventional transformation processes being selected from the group consisting of extrusion, injection molding, calendering and thermo-compression.

2. The process according to claim 1, wherein the manufactured products are flat plates with thicknesses greater than a millimeter.

3. The process according to claim 1 or 2, wherein said vinylaromatic polymer with a predominantly syndiotactic structure comprises at least one member selected from the group consisting of polymers of styrene and derivatives of styrene, and their copolymers containing up to 20 mole % of another copolymerizable monomer.

4. The process according to claim 1, wherein the polymer is sintered for a time period ranging from 1 minute to 10 hours.

5. The process according to claim 2, wherein said vinylaromatic polymer is sintered for a time period ranging from 1 minute to 10 hours.

6. The process according to claim 3, wherein said vinylaromatic polymer is sintered for a time period ranging from 1 minute to 10 hours.

7. The process according to claim 3, wherein said styrene derivative comprises at least one member selected from the group consisting of $C_1$–$C_4$ alkyl styrenes, halogenated styrenes, $C_1$–$C_4$ alkoxy styrenes, carboxy styrenes, vinylnaphthalenes, and vinyl tetrahydronaphthalenes.

8. The process according to claim 3, wherein said copolymer comprises at least one copolymerizable monomer selected from monomers having the general formula:

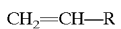

$$CH_2=CH-R$$

wherein R represents a hydrogen atom or a $C_1$–$C_6$ alkyl radical or a $C_4$–$C_{12}$ cyclo-alkyl radical.

9. A process for the preparation of a manufactured product from a syndiotactic polystyrene polymer having a morphology which is the original morphology of powder coming from synthesis, comprising:
    compressing the polymer in powder form at a pressure ranging from 0.1 to 500 MPa;
    sintering under pressure, the compressed powder at a temperature ranging from the glass transition temperature ($T_g$) to a temperature below the melting temperature ($T_m$) of the polymer to form the manufactured product; and
    cooling the manufactured product to room temperature,
    wherein said manufactured product has physical-mechanical characteristics which are comparable to a manufactured product obtained by conventional transformation processes based on complete melting of the polymer, said conventional transformation processes being selected from the group consisting of extrusion, injection molding, calendering and thermo-compression.

10. The process according to claim 9, wherein said manufactured products are flat plates with thicknesses greater than a millimeter.

11. The process according to claim 9, wherein said vinylaromatic polymer comprises at least one member selected from the group consisting of polymers of styrene and derivatives of styrene, and their copolymers containing up to 20 mole % of another copolymerizable monomer.

12. The process according to claim 10, wherein said vinylaromatic polymer is selected from polymers of styrene and derivatives of styrene, and their copolymers containing up to 20 mole % of another copolymerizable monomer.

13. The process according to claim 9, wherein said vinylaromatic polymer is sintered for a time period ranging from 1 minute to 10 hours.

14. The process according to claim 10, wherein said vinylaromatic polymer is sintered for a time period ranging from 1 minute to 10 hours.

15. The process according to claim 11, wherein said vinylaromatic polymer is sintered for a time period ranging from 1 minute to 10 hours.

16. The process according to claim 11, wherein said derivatives of styrene comprise at least one member selected from the group consisting of $C_1$–$C_4$ alkyl styrenes, halogenated styrenes, $C_1$–$C_4$ alkoxy styrenes, carboxy styrenes, vinylnaphthalenes, and vinyl tetrahydro naphthalenes.

17. The process according to claim 11, wherein said copolymerizable monomer has the general formula:

$$CH_2=CH-R$$

wherein R represents a hydrogen atom or a $C_1$–$C_6$ alkyl radical or a $C_4$–$C_{12}$ cyclo-alkyl radical.

* * * * *